United States Patent [19]

Tomaru

[11] Patent Number: 5,425,967
[45] Date of Patent: Jun. 20, 1995

[54] COATING APPARATUS AND METHOD INCLUDING A COATING HEAD HAVING A PLURALITY OF SLOTS FORMED BY MULTIPLE, ADJUSTABLE BLOCKS

[75] Inventor: Mikio Tomaru, Kanagawa, Japan

[73] Assignee: Fuji Photo Film Co., Ltd., Kanagawa, Japan

[21] Appl. No.: 230,205

[22] Filed: Apr. 20, 1994

[30] Foreign Application Priority Data

Apr. 20, 1993 [JP] Japan .................. 5-116335

[51] Int. Cl.⁶ ............................. B05D 3/12
[52] U.S. Cl. ........................ 427/356; 427/131; 427/358; 118/411; 425/466
[58] Field of Search ............ 427/356, 358, 131; 118/410, 411; 425/466

[56] References Cited

U.S. PATENT DOCUMENTS

| | | | |
|---|---|---|---|
| 4,145,173 | 3/1979 | Pelzer et al. | 425/466 |
| 5,072,688 | 12/1991 | Chino et al. | 118/411 |
| 5,167,713 | 12/1992 | Watanabe | 118/411 |
| 5,206,056 | 4/1993 | Shibata et al. | 118/410 |
| 5,324,357 | 6/1994 | Okuno et al. | 118/411 |

FOREIGN PATENT DOCUMENTS

| | | |
|---|---|---|
| 63-88080 | 4/1988 | Japan . |
| 2265672 | 10/1990 | Japan . |
| 422469 | 1/1992 | Japan . |
| 5212337 | 8/1993 | Japan . |

*Primary Examiner*—Shrive Beck
*Assistant Examiner*—Katherine A. Bareford
*Attorney, Agent, or Firm*—Sughrue, Mion, Zinn, Macpeak & Seas

[57] ABSTRACT

There is provided a coating head 10 having a structure in which a plurality of blocks 2, 3, 4, . . . capable of being moved up and down to adjust the relative height positions thereof are connected between an upstream pass roller 11 and a downstream pass roller 12 and in which at least two coating composition discharge slots are disposed between the connected blocks 2, 3, 4, . . . By the coating head 10, a multi-coating layer is formed on a running flexible support 1 laid between the upstream pass roller 11 and the downstream pass roller 12.

6 Claims, 6 Drawing Sheets

COATING APPARATUS AND METHOD INCLUDING A COATING HEAD HAVING A PLURALITY OF SLOTS FORMED BY MULTIPLE, ADJUSTABLE BLOCKS

BACKGROUND OF THE INVENTION

The present invention relates to a coating apparatus and a coating method for coating a flexible support with coating compositions at a high speed, and particularly to a coating apparatus and a coating method in which a continuously running flexible support is laminate-coated with coating compositions such as magnetic coating compositions multiply and simultaneously.

Heretofore, magnetic recording media such as a magnetic tape have been used generally as information recording media for information apparatuses such as video apparatuses, audio apparatuses, computers, etc. There are various methods and apparatuses for producing this type magnetic recording media. As one of the producing methods, a method of applying a coating composition such as a magnetic dispersion onto a film-like flexible support (hereinafter referred to as "support") formed of polyethylene terephthalate to thereby form a recording layer on the support is used widely because high efficiency in production is attained by this method. As a method of coating a coating surface of the support with a coating composition, there is a method using an extrusion type coating apparatus. As the method using an extrusion type coating apparatus, there is well-known a method in which a coating head having a slot for discharging a coating composition is urged against a surface of the support so that the discharged coating composition is applied to the surface of the support uniformly at a doctor edge portion. The shape of the doctor edge, the pressure of the coating composition, the distance between the support and the position of the top end of the doctor edge, and so on, have been disclosed, for example, in Unexamined Japanese Patent Publication (OPI) Nos. Sho. 60-238179, Sho. 62-117666, Sho. 62-132566 and Hei. 4-145977 and have been discussed variously.

When this coating method using an extrusion type coating apparatus is used, a multiplicity of coating layers can be formed on a surface of a support by discharging a plurality of coating compositions from a plurality of slots. By providing functions separated by the layers, a product having such excellent characteristic that a conventional coating support lacks can be produced. The method of for example, in Unexamined Japanese Patent Publication (OPI) producing such a multi-layered product has been disclosed, No. Sho. 63-88080 Japanese Patent Application No. Hei. 4-47746, and so on.

In the coating performed by the aforementioned extrusion type coating apparatus, however, a good coating layer cannot be formed until the balance between conditions such as the urging force of the edge surface of the coating head against the surface of the support, the discharge force of the coating composition, etc. is maintained. Particularly in the case of a coating method for forming two or more coating layers multiply and simultaneously, coating compositions ejected from respective slots are mixed with each other to form a mixed coating layer if positions of respective edge surfaces relative to the support are slightly different. Accordingly, the characteristic of the resulting coating layer becomes complex, so that it is difficult to produce a product having a multiplicity of coating layers formed thereon.

It is therefore necessary that factors of conditions such as the tension of the support, the position of the upstream pass roller on the upstream side in the direction of running of the support, the position of the downstream pass roller on the downstream side in the direction of running of the support, the shape of each edge surface, the position of each edge surface relative to the support, etc. are adjusted on the basis of experience to determine optimum conditions. There is however the case where good coating layers cannot be formed in accordance with the changes of the material quality, thickness, etc. of the support though optimum coating conditions are selected. It is therefore necessary that optimum conditions are retrieved and that a coating process is determined by testing on the basis of the retrieved optimum conditions whenever the material quality, thickness, etc. of the support are changed. It is the present situation that a large amount of time is required for such retrieval. Particularly in high-speed thin layer coating, the time required for retrieval of coating conditions becomes a serious issue because the adjustment of coating conditions is very delicate and extremely difficult.

SUMMARY OF THE INVENTION

It is therefore an object of the present invention to provide a coating apparatus and a coating method by which the disadvantage of the conventional coating method using an extrusion type coating apparatus is eliminated so that good coating conditions can be set easily when a plurality of coating compositions are to be applied onto a support multiply and simultaneously, particularly when high-speed thin layer coating is to be carried out.

The foregoing object of the present invention can be achieved by a coating apparatus of the extrusion type in which coating compositions are ejected from slots while a coating head is being urged against a running flexible support laid between an upstream pass roller and a downstream pass roller disposed on the upstream side and the downstream side respectively in the direction of running of the flexible support, characterized in that: the two pass rollers are formed so as to freely movable in the direction of the thickness of the support relative to the coating head; and the coating head has a plurality of the slots and edge surfaces constituted by three or more blocks which are formed so that the positions of the edge surfaces relative to the support can move back and forth along the coating composition discharge directions of the slots respectively. The foregoing object of the present invention can be also achieved by a coating method in which a plurality of coating compositions are ejected from a plurality of slots simultaneously while a coating head is being urged against a running flexible support laid between an upstream pass roller and a downstream pass roller disposed on the upstream side and the downstream side respectively in the direction of running of the flexible support, characterized in that: three or more edge surfaces of blocks constituting the plurality of slots are formed so as to be able to move back and forth toward a coating surface of the flexible support; and application of the plurality of coating compositions is carried out after all of the edge surfaces are adjusted so as to be in contact with at least the coating surface after the flexible support is laid between the upstream pass roller and the downstream pass roller.

DESCRIPTION OF THE PREFERRED EMBODIMENTS

Figure 2:
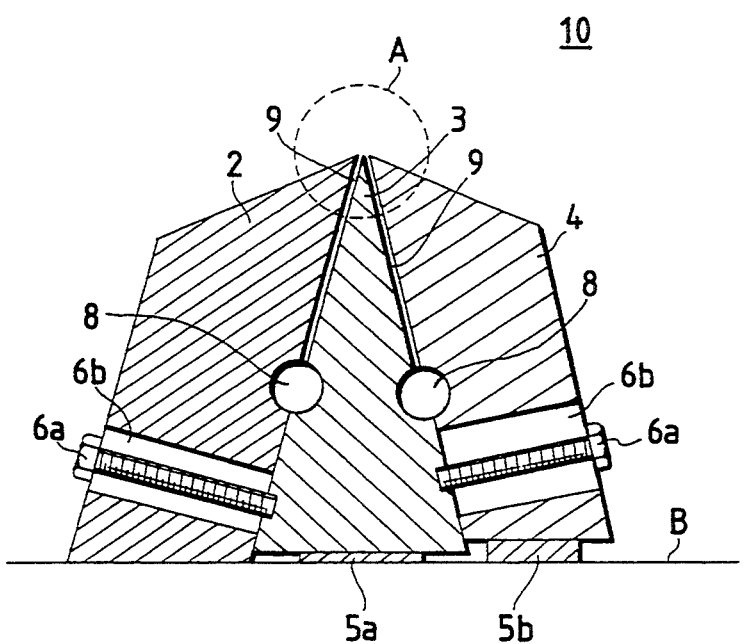
FIG. 2 is a cross sectional view showing the assembly and schematic structure of the coating head in the coating apparatus according to the present invention.
Figure 3:
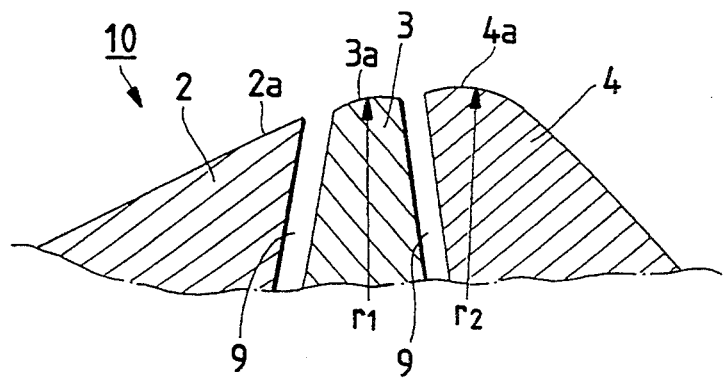
FIG. 3 is an enlarged view of part A of the coating apparatus depicted in FIG. 2.
Figure 4:
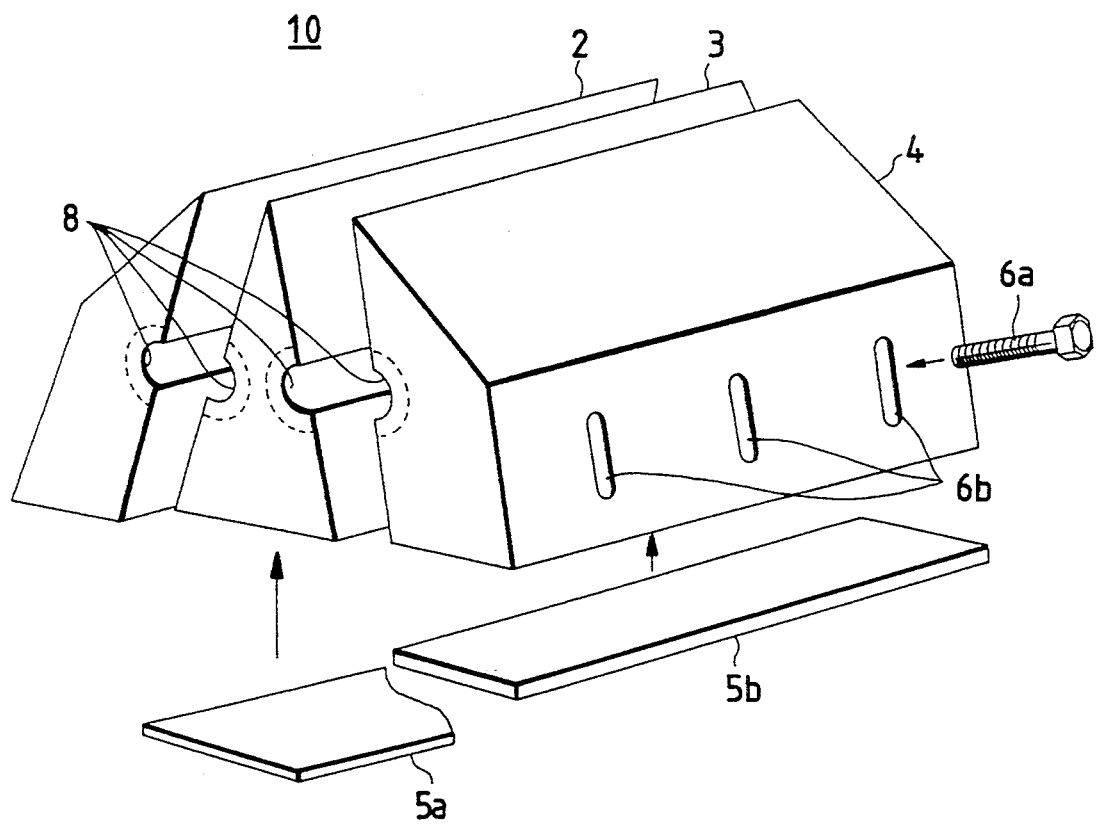
FIG. 4 is an exploded perspective view of the coating head in the coating apparatus according to the present invention.
Figure 5:
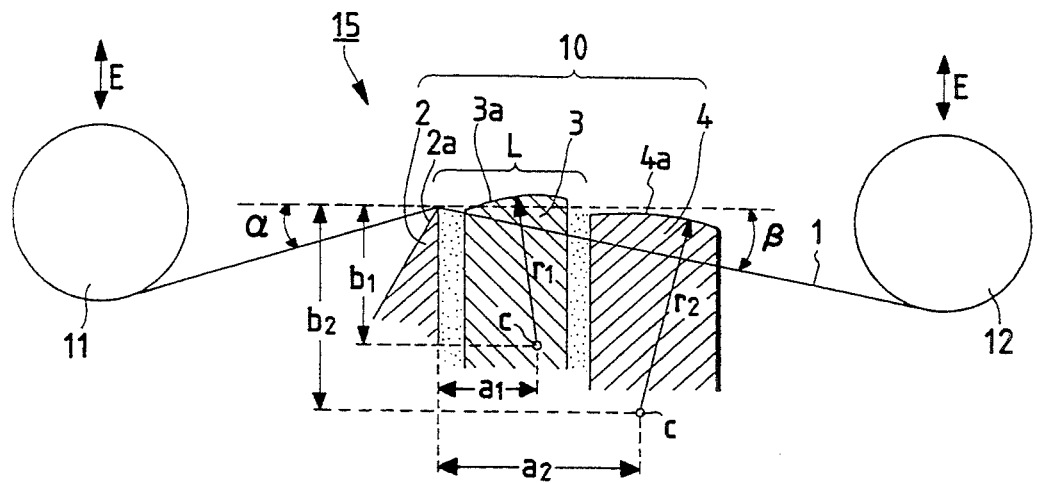
FIG. 5 is a schematic view showing the coating state obtained by the coating apparatus depicted in FIG. 3.

An embodiment of a coating apparatus according to the present invention will be described below with reference to FIGS. 2 through 5. FIG. 2 is a cross sectional view showing the schematic structure of a coating head 10 in a coating apparatus according to the present invention; FIG. 3 is an enlarged view of part A of the coating head 10 depicted in FIG. 2; FIG. 4 is an exploded perspective view showing the structure of the coating head 10; and FIG. 5 is a schematic view showing the positional relationship between an upstream pass roller 11 and a downstream pass roller 12 in the coating apparatus 15 according to the present invention and the state of coating of a support 1 by the coating head 10.

Describing now the coating head 10 shown in FIGS. 2 to 4, the coating head 10 is constituted by three blocks consisting of an upstream side block 2, an intermediate block 3 and a downstream side block 4. The blocks 2 and 4 are unitedly connected to the center block 3 by bolts 6a inserted in fastening holes 6b. In the coating head 10, an edge surface 2a opposite to a coating surface of the support 1, of the block 2 is provided as an inclined surface on which beads of a coating composition are formed suitably between the support 1 and the edge surface 2a to thereby prevent involving of air from occurring with the running of the support 1. Block edge surfaces 3a and 4a opposite to the support 1, of the blocks 3 and 4 are formed to have curvature values ($r_1$, $r_2$) so that the support 1 side swells up. Further, angles ($\alpha$ and $\beta$) of entrance of the support 1 with respect to the horizontal line can be selected to be, for example, in a range from of about 2 degrees to about 60 degrees.

Grooves each substantially shaped like a semicylinder formed from one end surface to the opposite end surface in the direction of crossing of the support 1 are formed in surfaces opposite to each other, of the blocks 2 and 3 and in surfaces opposite to each other, of the blocks 3 and 4. When the respective blocks are arranged so as to be opposite to each other, the grooves form liquid reservoirs 8, 8 for supplying coating compositions so that coating compositions can be fed to the liquid reservoirs 8, 8. When coating compositions are fed to the liquid reservoirs 8, 8 through liquid-feeding pumps (not shown), the coating compositions can be ejected from slots 9, 9 formed between the blocks 2 and 3 and between the blocks 3 and 4 toward a coating surface of the support 1.

The aforementioned coating head 10 is formed so that the relative height positions of the blocks 2, 3 and 4 can be adjusted. As for this height adjustment, for example, the heights of the blocks 3 and 4 are adjusted finely by inserting adjustment plates 5a and 5b in the bottom surfaces of the blocks 3 and 4 on a board-like jig B as shown in FIG. 2 and then the respective blocks are fixed to each other in this condition. When the coating head 10 which has been once assembled together is to be adjusted again, adjustment can be made again after the bolts 6a are loosened suitably. As shown in FIG. 5, the upstream pass roller 11 and the downstream pass roller 12 disposed on the upstream side and the downstream side, respectively, in the direction of running of the support 1 are supported suitably so that they can move in the direction of changing of the lap angles of the support (in the direction of the arrow E) relative to the edge surfaces of the coating head.

As the coating composition to be applied onto the surface of the support 1, two different magnetic coating compositions may be applied but the coating composition to form a lower layer may be applied so as to form an undercoating layer. That is, the present invention may be applied not only to a monolayer consisting of a magnetic layer but to a multilayer consisting of a plurality of magnetic layers and to a magnetic-layer and non-magnetic layer combination containing at least one magnetic layer.

Examples of the material for the support 1 to be coated with the aforementioned coating compositions such as magnetic coating compositions include: plastic film of polyesters such as polyethylene terephthalate, polyethylene naphthalate, etc., polyolefins such as polypropylene, etc., cellulose derivatives such as cellulose triacetate, cellulose diacetate, etc., vinyl resins such as polyvinyl chloride, etc., polycarbonates, polyamide resin, polysulfone, and so on; metal sheets of aluminum, copper, etc.; ceramics such as glass, etc.; and so on. These supports may be subjected to pre-treatment in advance, such as corona discharge treatment, plasma treatment, undercoating treatment, heat treatment, metal deposition treatment, alkali treatment, and so on.

The method of laminate-coating the support 1 with a plurality of magnetic recording layers simultaneously and multiply by using the aforementioned coating head 10 will be described below with reference to FIG. 5. In the coating apparatus 15 shown in FIG. 5, first, the relative positions of the upstream and downstream pass rollers 11 and 12 are adjusted so that the support tension of the support 1 to be laid therebetween is set suitably, and when the running of the support is stopped, the coating head 10 disposed between the upstream and downstream pass rollers 11 and 12 is brought into the support 1. In this occasion, adjustment is made suitably so that all of the edge surfaces 2a, 3a and 4a are brought into the surface of the support 1. After the completion of the aforementioned adjustment, respective coating compositions are fed by liquid-feeding pumps not shown and, at the same time, the support 1 laid between the pass rollers 11 and 12 is made to run for the purpose of starting the coating process. Accordingly, setting for good coating is completed in an extremely short time.

Figure 1:
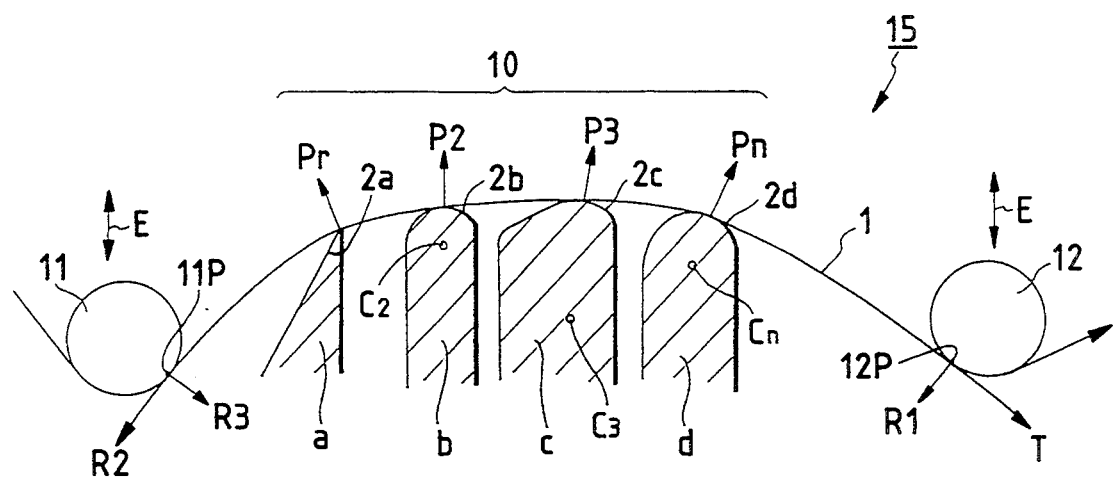
FIG. 1 is a theoretical view for explaining the procedure of setting a coating head in a coating apparatus according to the present invention.

The operation of adjusting the coating head 10 in the coating apparatus 15 having the aforementioned structure will be described below. This adjusting operation will be described with reference to the theoretical view of the coating head shown in FIG. 1. The coating head 10 is disposed between the upstream pass roller 11 and the downstream pass roller 12 in the coating apparatus shown in FIG. 1. For example, the coating head 10 is constituted by four blocks a, b, c and d. The uppermost stream side block a has a back edge surface 2a which is inclined suitably. The other blocks b, c and d have doctor edge surfaces 2b, 2c and 2d, respectively. For example, the relative heights between the respective blocks of the coating head 10 in the coating apparatus 15 can be obtained from the differences in level between the top end of the uppermost stream side block a and the respective centers $C_2$, $C_3$ and $C_n$ of curvature the edge surfaces of the other blocks. For example, the relative distances between the respective blocks can be determined on the basis of the distances between the downstream end surface of the uppermost stream side block a and the respective centers $C_2$, $C_3$ and $C_n$ of curvature the edge surfaces of the other blocks. The support 1 is laid between the upstream pass roller 11 and the downstream pass roller 12. The tension of the support 1 and drags at the respective edge surfaces 2a, 2b, 2c and 2d are converted into values in the case where the support 1 has a specific width (for example, 1 m). It is now assumed that the support 1 receives tension T and drag R1 in the tangential and normal directions respectively at a position 12P of contact with the downstream pass roller 12 and receives drag R2 and drag R3 in the tangential and normal directions respectively at a position 11P of contact with the upstream pass roller 11.

It is further assumed theoretically that the support 1 receives drag from edge surfaces of n blocks and that contact force acts on the support perpendicularly. In the case where each edge surface is shaped like a circular arc, the support is in contact with the block at one point so that drag acts in the direction of a normal line of the circular arc. Let Pi be drag received from the edge of the i-th block. In the case where the number of blocks is n, R1 to R3 and drags P1 to Pn are considered as unknown values. These unknown values are determined on the basis of balance of force in the x direction (the direction of a line connecting the two pass rollers in the drawing), balance of moment M for balance of force in the y direction (the direction perpendicular to the x direction) and the boundary conditions with respect to the deflection shape of the support. The deflection shape of the support is obtained by integrating Expression 1.

$$S \cdot \frac{d}{dx} \frac{dy/dx}{1 + (dy/dx)^2} = M \qquad \text{expression 1}$$

The bending stiffness S of the support is expressed by Expression 2.

$$S = E \cdot b \cdot h^3 / 12 \qquad \text{expression 2}$$

E: Young's modulus of the support material [kg/mm²]
b: width of the support [mm]
n: thickness of the support [mm]

In the expressions, M represents moment given to the support by external force. As the boundary conditions, there are positions of contact with the upstream and downstream pass rollers, positions of contact with the respective edges, continuity at points of contact with the respective edges and differential continuity at the same points. As the number of the unknown values, the number of forces and the number of integration constants in the deflection shape are $(n+3)$ and $(2n+2)$, respectively, that is, $(3n+5)$ in total. The number of equations of balance, the number of boundary conditions related to the positions and the number of boundary conditions related to continuity are 3, $n+2$ and $2n$, respectively, that is, $(3n+5)$ in total. All the unknown values are determined uniquely. In the case where the edge surface of each block is shaped like a circular arc, the contacting position per se becomes unknown but is determined also uniquely because the relation between position and differentiation $(dy/dx)$ is given as a condition by a tangent line in common with the circular arc at a point of contact. As a solving method, numerical solution such as finite element method, difference calculus, etc. is effective. If calculation is made with respect to all positions between the upstream and downstream pass rollers in the case where these methods are employed, a large number of elements are required so that a large calculation time is required. Therefore, if two end points of calculation regions are selected so as to be on lines connecting points (11P and 12P) of contact of the pass rollers 11 and 12 with the support and a representative point (for example, a point on the edge surface of the center block) on the edge surfaces of the respective blocks and in positions sufficiently far from the edge surfaces of the blocks so that calculation is made only with respect to the inside of the two end points, drag can be obtained in a short time.

The distance to an end point can be determined by judgment as to whether the inclination at the end point of the support obtained by calculation is substantially parallel to a line connecting the position of contact of the pass roller with the support and the representative point of the block edge or not. By adjusting the tension of the support, the positions of the pass rollers, the shape of each block edge and the relative positions between the plurality of edge surfaces so that the thus obtained drags at the all block edges are set to plus values, good coasting can be performed.

The coating apparatus of the present invention is not limited to the forms shown in the respective drawings, and the shape of each part of the coating head, the fastening structure of each block, and so on, can be changed suitably.

As described above, in the coating apparatus according to the present invention, a coating head having a structure of connection of a plurality of blocks capable of being moved up and down to adjust the relative height positions thereof and provided with at least two slots formed between the blocks is disposed between an upstream pass roller and a downstream pass roller. Accordingly, the pass rollers can move freely in the direction of the thickness of the support relative to the coating head so that not only the heights of the respective blocks but the lap angles of the support can be adjusted. Accordingly, not only the adjustment of heights of the edge surfaces of the respective blocks is made easily but the lap adjustment of the support with respect to the coating head is made easily. As a result, setting of good coating conditions for coating a support with a plurality of coating compositions simultaneously and multiply can be made speedily.

Further, in the coating method according to the present invention, when a support which is laid between upstream and downstream pass rollers and runs therebetween stops the running thereof, a coating process is not carried out unless a surface of the support is brought into contact with the edge surfaces of all blocks constituting a coating head by using the aforementioned coating apparatus in the condition in which there is no coating composition ejected from slots of the coating head. Accordingly, not only the adjustment of the heights of the edge surfaces of the respective blocks but the lap adjustment of the support with respect to the coating head can be made speedily and accurately. Accordingly, good coating conditions for respective coating layers can be set accurately and speedily at the time of high- speed and thin-layer coating of a surface of a support with a plurality of coating compositions simultaneously and multiply even in the case where coating compositions are changed. As a result, high-quality products can be provided stably and efficiently.

EXAMPLES

Effects of the present invention will be made more clear from the following specific examples. After the components of each of magnetic coating compositions A and B shown in Tables 1 and 2 were put into a ball mill, mixed and dispersed enough, epoxy resin (epoxy equivalent 500) was added thereto by 30 parts by weight, mixed and dispersed uniformly to thereby prepare magnetic coating compositions as coating compositions to be applied onto a support.

TABLE 1

| Magnetic Coating Composition A | |
| --- | --- |
| $\gamma$-$Fe_2O_3$ powder (needle-like particles of average grain size in the direction of length: 0.5 $\mu$m, coercive force: 320 oersted) | 300 parts by weight |
| vinyl chloride-vinyl acetate copolymer (copolymerization ratio: 87:13, copolymerization degree: 400) | 30 parts by weight |
| conductive carbon | 20 parts by weight |
| polyamide resin (amin-valent: 300) | 15 parts by weight |
| lecithin | 6 parts by weight |
| silicon oil (dimethyl polysiloxane) | 3 parts by weight |
| xylene | 300 parts by weight |
| methyl isobutyl ketone | 300 parts by weight |
| n-butanol | 100 parts by weight |

TABLE 2

| Magnetic Coating Composition B | |
| --- | --- |
| Co-$\gamma$-$Fe_2O_3$ powder (needle-like particles of average grain size in the direction of length: 0.3 $\mu$m, coercive force: 670 oersted) | 300 parts by weight |
| vinyl chloride-vinyl acetate copolymer (copolymerization ratio: 87:13, copolymerization degree: 400) | 30 parts by weight |
| conductive carbon | 20 parts by weight |
| polyamide resin (amin-valent: 300) | 15 parts by weight |
| lecithin | 6 parts by weight |
| silicon oil (dimethyl polysiloxane) | 3 parts by weight |
| xylene | 300 parts by weight |
| methyl isobutyl ketone | 300 parts by weight |
| n-butanol | 100 parts by weight |

Figure 6:
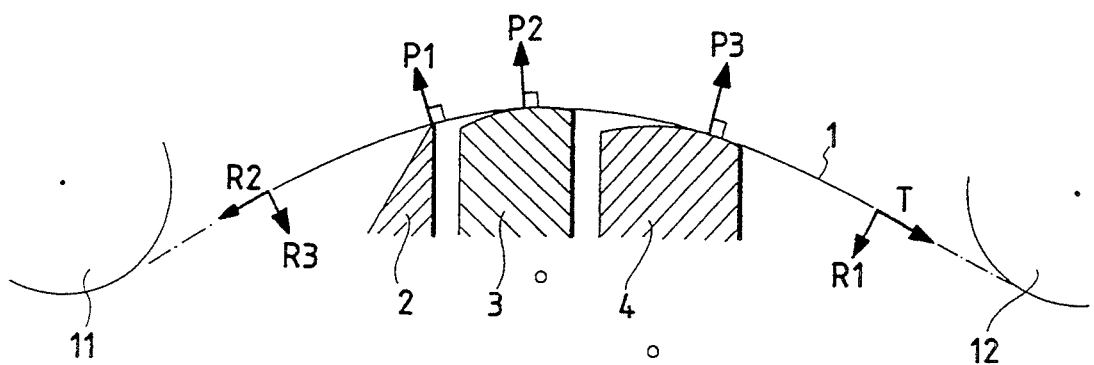
FIG. 6 is an explanatory view showing the conditions of tension and drag in a support laid between upstream and downstream pass rollers in the coating apparatus according to the present invention.

A coating apparatus 15 (in which three blocks were used) shown in FIG. 5 was used as a coating apparatus for forming coating layers. As to the coating head 10, results of calculation of the relations between $b_1$ and drags $P_1$, $P_2$ and $P_3$ were measured when relative heights $b_1$ and $b_2$ between the blocks 2, 3 and 4 (the reference positions for the measurement were selected so that the difference between the top end of the uppermost stream side block and the center c of curvature of the edge surface of each of the other blocks was measured); relative distances $a_1$ and $a_2$ between the blocks 2, 3 and 4 (the reference positions for the measurement were selected so that the distance between the downstream end surface of the uppermost stream side block and the center c of curvature of the edge surface of each other block was measured); angles $\alpha$ and $\beta$ of inclination of the support 1 with respect to the blocks 2, 3 and 4; radii $r_1$, $r_2$ and $r_3$ of curvature of the blocks 2, 3 and 4; tension T of the support 1; drags $P_1$, $P_2$ and $P_3$ received by the support 1 from respective normal directions at points of contact with the blocks 2, 3 and 4 (see FIG. 6); the thickness of the support; and the stiffness of the support were fixed. The positions of the pass rollers 11 and 12, the relations between relative positions of the edge surfaces and the quantity and symbol expressing the tension of the support were as shown in FIG. 6.

Example 1

Figure 7:
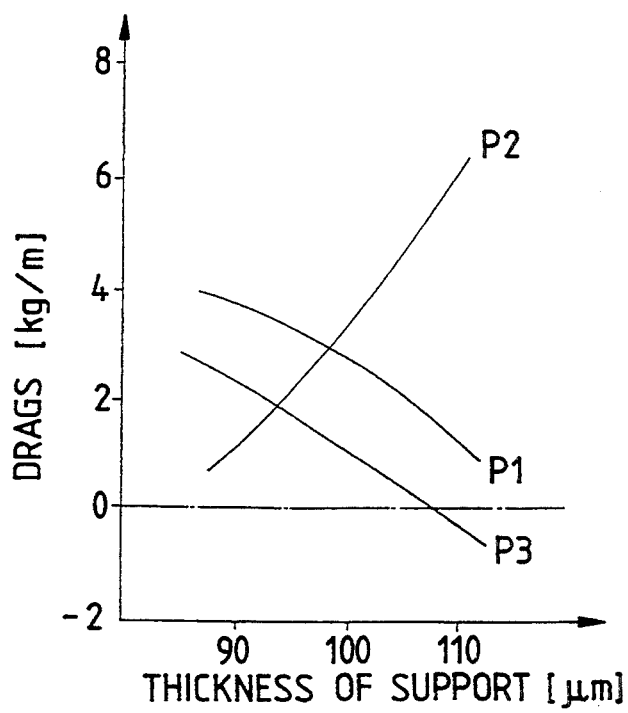
FIG. 7 is a characteristic curve graph showing the relations between the thickness of the support and drag received from the edge surface of each block as measured in Example 1.

The relations between (support thickness) and drags P1 to P3 were calculated in accordance with calculation expressions in the case where respective values were fixed as follows: the radius of curvature of the block 2, r1=5.000 mm; r2=8.000 mm; a1=1.000 mm; a2=1.700 mm; b1=4.945 mm; b2=7.950 mm; $\alpha$=15°; $\beta$=5°; T=20 kg/m; and (support stiffness)=600 kg/mm². The values of drags as representative values and results of coating were shown in FIG. 7. Then, three representative values in which drags became more negative than those shown in FIG. 7, that is, near such critical values that the support 1 became free from the edge surfaces were selected, so that coating was carried out practically. The coating speed and the quantity of coating were selected to be 200 m/min and 10 g per 1 m², respectively. The values of drags as representative values and results of coating were shown in Table 3. In the evaluation shown in the column "Result of Coating", irregularity of thickness of coating film was observed.

TABLE 3

| Thickness of Support [μm] | Results of Calculation | | | Result of Coating |
|---|---|---|---|---|
| | P1 [kg/m] | P2 [kg/m] | P3 [kg/m] | |
| 90.0 | 3.80 | 1.17 | 2.37 | Good |
| 100.0 | 2.86 | 3.40 | 1.13 | Good |
| 110.0 | 1.61 | 6.14 | −0.33 | Bad |

Example 2

Figure 8:
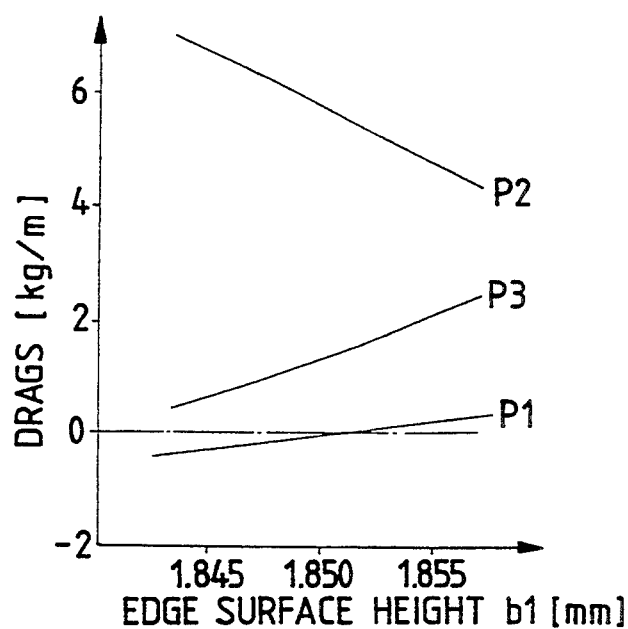
FIG. 8 is a characteristic curve graph showing the relations between the position of the edge surface height of each block and drag received from the edge surface of each block as obtained in Example 2.

The relations between b1 and drags P1 to P3 were obtained by calculation in the case where respective values were fixed as follows: r1=2.000 mm, r2=3.000 mm, a1=0.800 mm, a2=1.140 mm, b2=2.850 mm, $\alpha=17°$, $\beta=3°$, T=20 kg/m, (support thickness)=30 μm, (support stiffness)=600 kg/mm². Results of calculation were shown in FIG. 8. Then, three representative values of b1 in which drags became more negative than those shown in FIG. 8, that is, near such critical values that the support became free from the edge surfaces were selected, so that coating was carried out practically. The coating speed and the quantity of coating were selected to be 200 m/min and 10 g per 1 m², respectively. The values of drags as representative values and results of coating were shown in Table 4.

TABLE 4

| b1 [mm] | Results of Calculation | | | Result of Coating |
|---|---|---|---|---|
| | P1 [kg/m] | P2 [kg/m] | P3 [kg/m] | |
| 1.845 | −0.27 | 6.67 | 0.65 | Bad |
| 1.850 | −0.01 | 5.70 | 1.39 | Bad |
| 1.855 | 0.22 | 4.76 | 2.11 | Good |

Example 3

Figure 9:
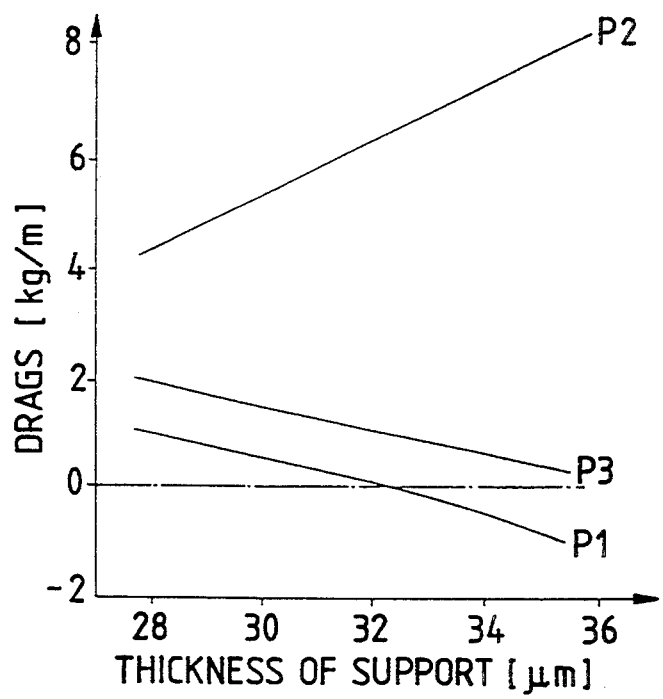
FIG. 9 is a characteristic curve graph showing the relations between the thickness of the support and drag received from the edge surface of each block as obtained in Example 3.

The relations between the thickness of the support and drags P1 to P3 were obtained by calculation in the case where respective values were fixed as follows: r1=2.000 mm, r2=3.000 mm, a1=0.800 mm, a2=1.140 mm, b1=1.850 mm, b2=2.850 mm, $\alpha=18°$, $\beta=3°$, T=20 kg/m, (support stiffness)=600 kg/mm². Results of calculation were shown in FIG. 9. Then, three representative values of the support thickness in which drags became more negative than those shown in FIG. 9, that is, near such critical values that the support became free from the edge surfaces were selected, so that coating was carried out practically. The coating speed and the quantity of coating were selected to be 200 m/min and 10 g per 1 m², respectively. The values of drags as representative values and results of coating were shown in Table 5.

TABLE 5

| Thickness of Support [μm] | Results of Calculation | | | Result of Coating |
|---|---|---|---|---|
| | P1 [kg/m] | P2 [kg/m] | P3 [kg/m] | |
| 28.0 | 1.01 | 4.39 | 2.04 | Good |
| 30.0 | 0.56 | 5.34 | 1.53 | Good |
| 35.0 | −0.79 | 7.80 | 0.39 | Bad |

Example 4

Figure 10:
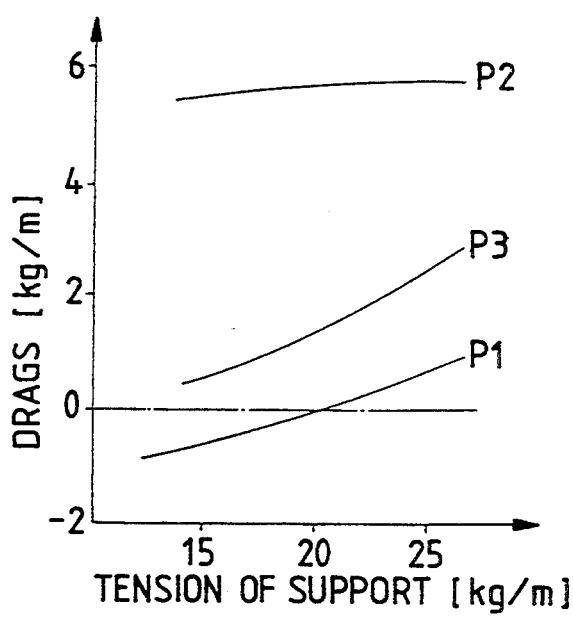
FIG. 10 is a characteristic curve graph showing the relations between the tension of the support and drag received from the edge surface of each block as obtained in Example 4.

The relations between T and drags P1 to P3 were obtained by calculation in the case where respective values were fixed as follows: r1=2.000 mm, r2=3.000 mm, a1=0.800 mm, a2=1.140 mm, b1=1.850 mm, b2=2.850 mm, $\alpha=17°$, $\beta=3°$, (support thickness)=30 μm, (support stiffness)=600 kg/mm². Results of calculation were shown in FIG. 10. Then, three representative values of T in which drags became more negative than those shown in FIG. 10, that is, near such critical values that the support became free from the edge surfaces were selected, so that coating was carried out practically. The coating speed and the quantity of coating were selected to be 200 m/min and 10 g per 1 m², respectively. The values of drags as representative values and results of coating were shown in Table 6.

TABLE 6

| T [kg/m] | Results of Calculation | | | Result of Coating |
|---|---|---|---|---|
| | P1 [kg/m] | P2 [kg/m] | P3 [kg/m] | |
| 15.0 | −0.64 | 5.41 | 0.53 | Bad |
| 20.0 | −0.01 | 5.70 | 1.39 | Bad |
| 25.0 | 0.65 | 5.73 | 2.47 | Good |

Example 5

Figure 11:
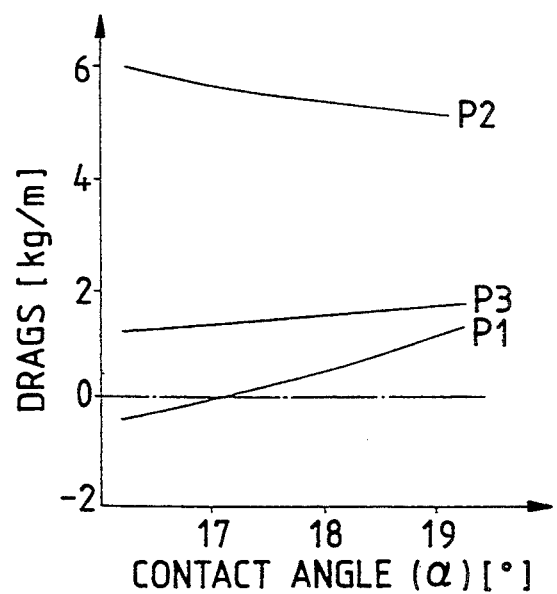
FIG. 11 is a characteristic curve graph showing the relations between the contact angle of the support with respect to the edge surface of each block and drag received from the edge surface of each block as obtained in Example 5.

The relations between $\alpha$ and drags P1 to P3 were obtained by calculation in the case where respective values were fixed as follows: r1=2.000 mm, r2=3.000 mm, a1=0.800 mm, a2=1.140 mm, b1=1.850 mm, b2=2.850 mm, $\beta=3°$, T=20 kg/m, (support thickness)=30 μm, (support stiffness)=600 kg/mm². Results of calculation were shown in FIG. 11. Then, four representative values of the angle $\alpha$ in which drags became more negative than those shown in FIG. 11, that is, near such critical values that the support became free from the edge surfaces were selected, so that coating was carried out practically. The coating speed and the quantity of coating were selected to be 200 m/min and 10 g per 1 m², respectively. The values of drags as representative values and results of coating were shown in Table 7.

TABLE 7

| $\alpha$ [°] | Results of Calculation | | | Result of Coating |
|---|---|---|---|---|
| | P1 [kg/m] | P2 [kg/m] | P3 [kg/m] | |
| 16.5 | −0.30 | 5.83 | 1.35 | Bad |
| 17.0 | −0.01 | 5.70 | 1.39 | Bad |
| 18.0 | 0.56 | 5.34 | 1.53 | Good |
| 19.0 | 1.11 | 5.07 | 1.61 | Good |

Example 6

Figure 12:
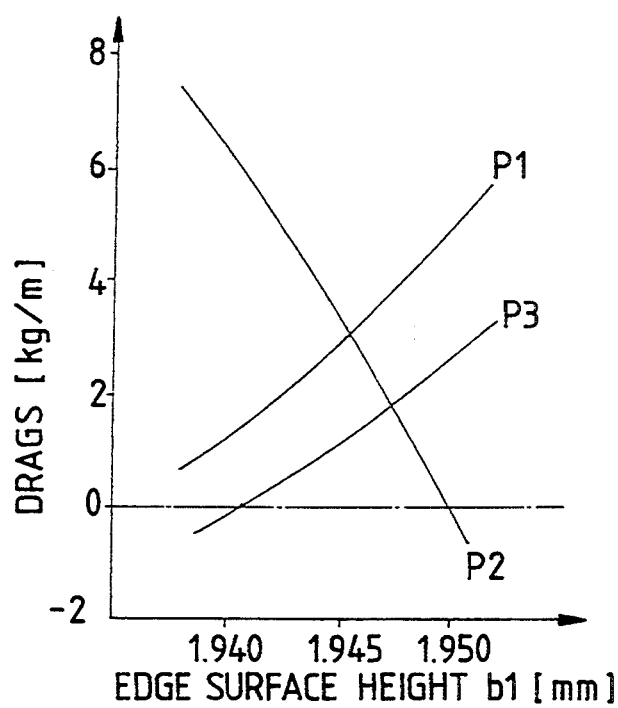
FIG. 12 is a characteristic curve graph showing the relations between the thickness of the support and drag received from the edge surface of each block as obtained in Example 6.

The relations between b1 and drags P1 to P3 were obtained by calculation in the case where respective values were fixed as follows: r1=5.000 mm, r2=8.000 mm, a1=1.000 mm, a2=1.700 mm, b2=7.950 mm, $\alpha=15°$, $\beta=5°$, T=20 kg/m, (support thickness)=100 μm, (support stiffness)=600 kg/mm². Results of calculation were shown in FIG. 12. Then, three representative values of b1 in which drags became more negative than those shown in FIG. 12, that is, near such critical values that the support became free from the edge surfaces were selected, so that coating was carried out practically. The coating speed and the quantity of coating were selected to be 200 m/min and 10 g per 1 m², respectively. The values of drags as representative values and results of coating were shown in Table 8.

TABLE 8

| Results of Calculation and Result of Coating in Example 5 | | | | |
|---|---|---|---|---|
| b1 [mm] | Results of Calculation | | | Result of Coating |
| | P1 [kg/m] | P2 [kg/m] | P3 [kg/m] | |
| 4.940 | 1.20 | 6.38 | −0.23 | Bad |
| 4.945 | 2.86 | 3.40 | 1.13 | Good |
| 4.950 | 4.85 | −0.02 | 2.58 | Bad |

As was obvious from Tables 3 through 8, it was found that the result of coating was worsened when some non-contact portion was present between the support and each edge surface. By maintaining the contact state between the support and each edge surface according to the present invention, good coating layers were obtained.

What is claimed is:

1. A coating method in which a plurality of coating compositions are ejected from a plurality of slots simultaneously while a coating head is being urged against a running flexible support laid between an upstream pass roller and a downstream pass roller disposed on an upstream side and a downstream side respectively in a direction of running of said flexible support, comprising the steps of:

adjusting three or more edge surfaces of blocks constituting said plurality of slots by individually moving said edge surfaces toward or away from a coating surface of said flexible support; and carrying out application of said plurality of coating compositions after all of said edge surfaces are adjusted so as to be in contact with at least said coating surface after said flexible support is laid between said upstream pass roller and said downstream pass roller.

2. The coating method according to claim 1, wherein said step of adjusting said edge surfaces further comprises adjusting said edge surfaces by inserting at least one adjustment plate between a bottom surface of at least one of said blocks and a jig, and then fixing said blocks together.

3. An extrusion coating apparatus in which coating compositions are ejected from slots defining respective coating composition discharge directions while a coating head is being urged against a running flexible support laid between an upstream pass roller and a downstream pass roller disposed on an upstream side and a downstream side respectively in a direction of running of the flexible support, wherein: said two pass rollers are formed so as to be freely movable in a thickness direction of the support toward and away from said coating head; and said coating head has a plurality of said slots and edge surfaces constituted by three or more blocks, said blocks including means for adjustably setting said edge surfaces relative to each other so that said edge surfaces are individually adjustable toward and away from said support along the coating composition discharge directions of said slots, respectively.

4. The extrusion coating apparatus according to claim 3, wherein said three or more blocks comprise an upstream block, an intermediate block and a downstream block, said upstream block and said downstream block being unitedly connected to said intermediate block via said means for adjustably setting said edge surfaces.

5. The extrusion coating apparatus according to claim 4, wherein said means for adjustably setting said edge surfaces comprises at least one elongated hole formed through each of said upstream and downstream blocks and which receives a corresponding fastening member.

6. The extrusion coating apparatus according to claim 5, wherein said means for adjustably setting said edge surfaces further comprises at least one adjustment plate disposed at a bottom surface of at least one of said upstream block, said intermediate block and said downstream block.

* * * * *